US012578250B2

(12) United States Patent
Han et al.

(10) Patent No.: US 12,578,250 B2
(45) Date of Patent: Mar. 17, 2026

(54) APPARATUS AND METHOD FOR VERIFYING VEHICLE SEAT ANTI-PINCH

(71) Applicants: Hyundai Motor Company, Seoul (KR); Kia Corporation, Seoul (KR); Dae Won San Up Co., Ltd., Ansan-si (KR)

(72) Inventors: Kug Hun Han, Seoul (KR); Yohan Kim, Ansan-si (KR); Donghoon Lee, Seoul (KR); Jae Myung Hur, Seoul (KR); Jong Ho Lim, Siheung-si (KR); Hyun Tae Lee, Incheon (KR); Han Jin Kim, Suwon-si (KR)

(73) Assignees: Hyundai Motor Company, Seoul (KR); Kia Corporation, Seoul (KR); Dae Won San Up Co., Ltd., Ansan-si (KR)

( * ) Notice: Subject to any disclaimer, the term of this patent is extended or adjusted under 35 U.S.C. 154(b) by 329 days.

(21) Appl. No.: 18/460,816

(22) Filed: Sep. 5, 2023

(65) Prior Publication Data

US 2024/0110846 A1 Apr. 4, 2024

(30) Foreign Application Priority Data

Sep. 30, 2022 (KR) ........................ 10-2022-0125304

(51) Int. Cl.
*G01M 13/00* (2019.01)

(52) U.S. Cl.
CPC .................................. *G01M 13/00* (2013.01)

(58) Field of Classification Search
CPC .. G01M 13/00; G01M 17/007; G01M 99/001; B60R 21/01; B60N 2/0226
See application file for complete search history.

(56) References Cited

U.S. PATENT DOCUMENTS

| | | | | | |
|---|---|---|---|---|---|
| 2,301,841 | A | * | 11/1942 | Zeder | G01M 99/001 |
| | | | | | 33/561.1 |
| 3,592,041 | A | * | 7/1971 | Spencer | G01M 99/001 |
| | | | | | 73/161 |
| 5,373,749 | A | * | 12/1994 | Strand | G01M 7/08 |
| | | | | | 73/865.3 |
| 5,641,917 | A | * | 6/1997 | Hurite | G01M 99/001 |
| | | | | | 73/865.6 |
| 5,703,303 | A | * | 12/1997 | Stewart | G01M 99/001 |
| | | | | | 73/7 |
| 5,831,172 | A | * | 11/1998 | Kidd | G01M 99/007 |
| | | | | | 73/862.391 |

(Continued)

*Primary Examiner* — Freddie Kirkland, III
(74) *Attorney, Agent, or Firm* — Slater Matsil, LLP

(57) ABSTRACT

An embodiment apparatus for verifying a vehicle seat anti-pinch includes a base including a plurality of assembly holes, a seat mounting unit assembled to an upper portion of the base through the assembly holes, a seat mounted to an upper portion of the seat mounting unit, a support structure assembled at a rear of the seat mounting unit, and a measurement unit assembled to the upper portion of the base through the assembly holes, the measurement unit including a pressure measuring device movably mounted to a number of measuring points corresponding to main body parts of a passenger in a rear seat by the support structure, wherein the measurement unit is configured to measure a physical contact with the seat and a pressing force through the pressure measuring device.

20 Claims, 12 Drawing Sheets

(56)　　　　　References Cited

U.S. PATENT DOCUMENTS

| | | | | |
|---|---|---|---|---|
| 6,131,436 | A * | 10/2000 | O'Bannon | G01M 99/001 |
| | | | | 73/865.6 |
| 6,386,054 | B1 * | 5/2002 | Jones | G01M 99/001 |
| | | | | 73/865.6 |
| 6,769,318 | B2 * | 8/2004 | Gabiniewicz | G01M 99/001 |
| | | | | 73/865.9 |
| 7,346,996 | B2 * | 3/2008 | Schleif | B60N 2/28 |
| | | | | 33/833 |
| 10,598,475 | B2 * | 3/2020 | Jammalamadaka | G01B 5/0025 |
| 11,453,350 | B2 * | 9/2022 | Kodama | G01M 17/0072 |
| 2004/0123683 | A1 * | 7/2004 | Gabiniewicz | G01M 99/001 |
| | | | | 73/862.541 |
| 2006/0226692 | A1 * | 10/2006 | Schleif | B60N 2/2887 |
| | | | | 297/463.2 |
| 2022/0357255 | A1 * | 11/2022 | Levesque | G01M 99/008 |
| 2025/0100504 | A1 * | 3/2025 | Jeon | B60R 22/48 |

* cited by examiner

First embodiment

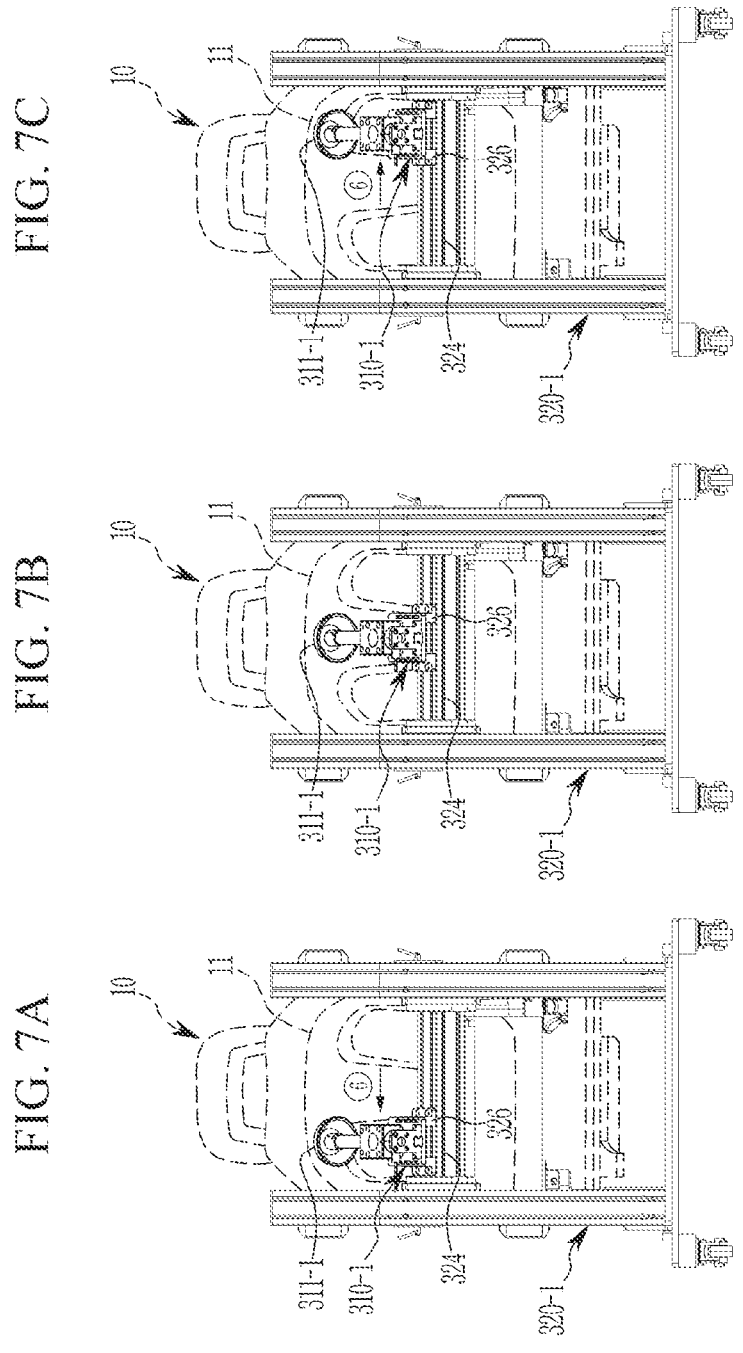

FIG. 10
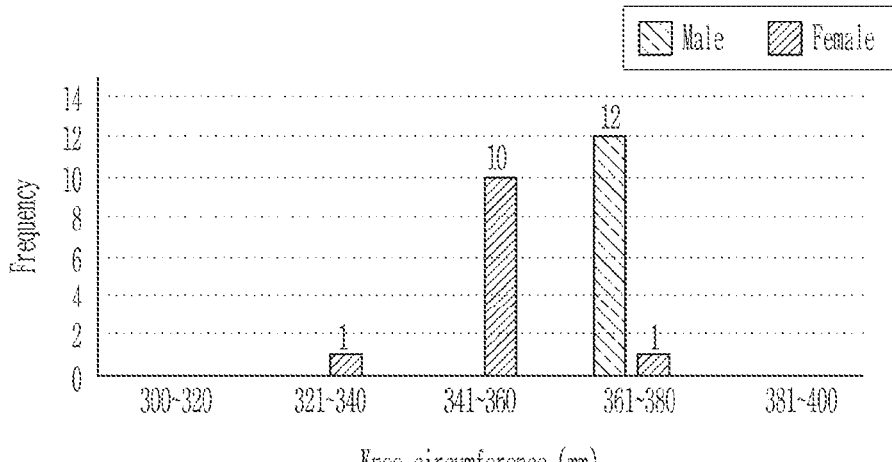
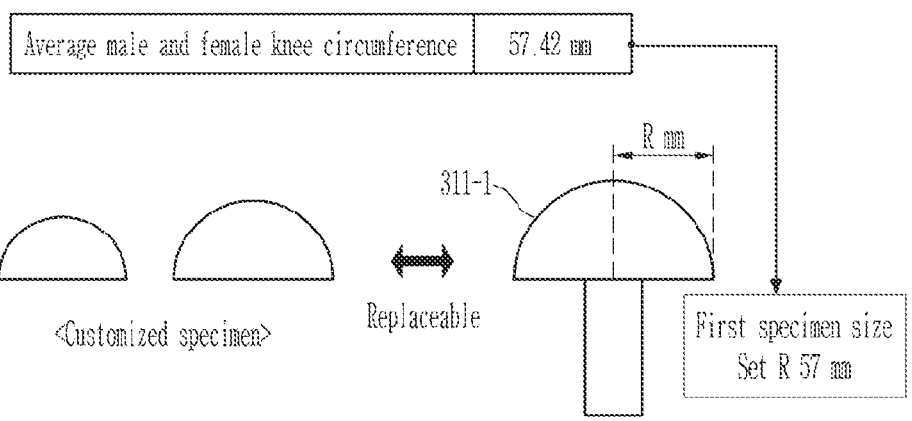

FIG. 11
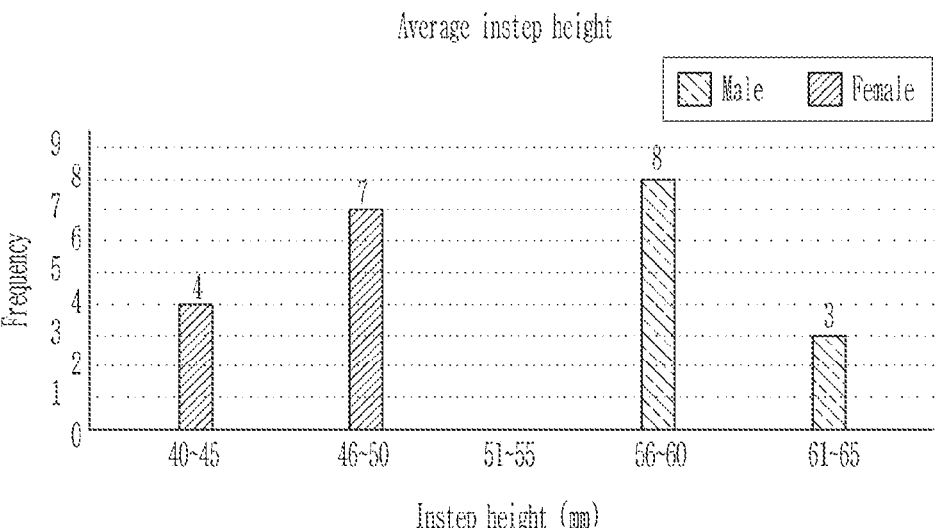
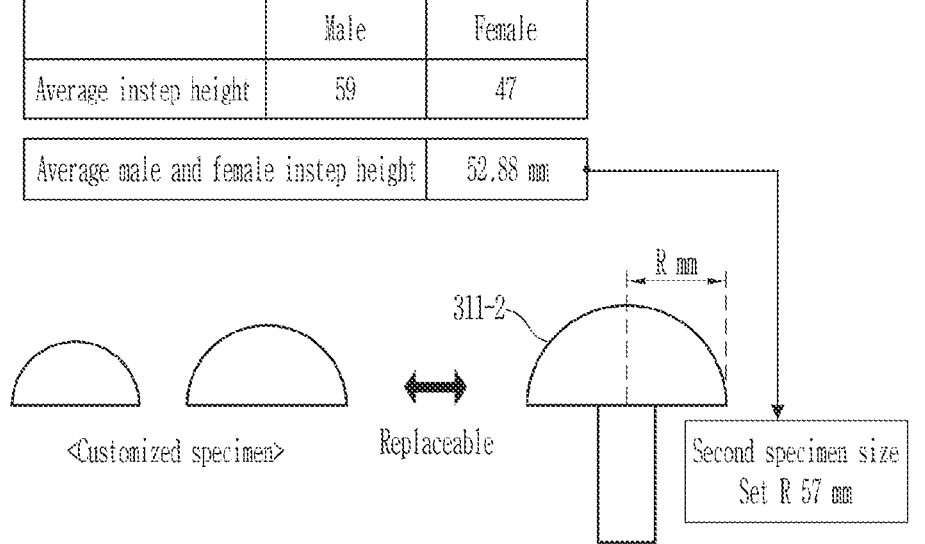

APPARATUS AND METHOD FOR VERIFYING VEHICLE SEAT ANTI-PINCH

CROSS-REFERENCE TO RELATED APPLICATIONS

This application claims the benefit of Korean Patent Application No. 10-2022-0125304, filed on Sep. 30, 2022, which application is hereby incorporated herein by reference.

TECHNICAL FIELD

The present disclosure relates to an apparatus and a method for verifying vehicle seat anti-pinch.

BACKGROUND

In recent years, vehicles have the added value of a resting place beyond the traditional concept of a means of transportation, and as such, various functions are being added to seats for occupants' rest and convenience.

For example, automation features in the vehicle seat include a relax (also known as a relaxation) feature that adjusts a seat's angle with one touch to put a passenger in a zero-gravity neutral position, and an easy access feature that automatically slides the seat to make room for the passenger to get in and out of the vehicle and adjusts a memory seat to fit a driver's body shape.

Most of these automation features use hotkeys to automatically adjust the posture of an electric powered seat with one touch. However, the seat may interfere with body parts such as a knee, instep of a foot, or a shin of a rear seat passenger during the automatic posture adjustment operation, and there is a risk of injury in case of high contact strength. Therefore, an anti-pinch verification system is required to prevent damage to passengers due to the interference with the seat upon application of the automation features in the vehicle.

However, a conventional seat tester only tests strength and stiffness of the seat related to laws and regulations, or mechanically inspects NVH (Noise, Vibration, Harshness), durability of use, etc. for failure determination and verification of merchantability, and there is a problem in that there is no device for anti-pinch verification of seats with the automation features.

SUMMARY

The present disclosure relates to an apparatus and a method for verifying vehicle seat anti-pinch. Particular embodiments relate to an apparatus and a method for verifying vehicle seat anti-pinch to verify anti-pinch logic by reflecting seat package conditions applicable to various vehicles.

An embodiment of the present disclosure provides an apparatus and method for verifying a vehicle seat anti-pinch that mount a seat and a measurement unit on a base and are capable of adjusting a specimen position of a measurement unit so that a pinch measurement is possible at multiple measurement points that correspond to a passenger's body part on the rear seat by reflecting seat package conditions that are applied to a vehicle.

Another embodiment of the present disclosure provides an apparatus and method that are capable of verifying a vehicle seat anti-pinch for multi-vehicle and multi-model seats by replacing and mounting specimens of various sizes for testing on various body sizes of passengers and adjusting front and rear distances from the seat.

According to one embodiment of the present disclosure, an apparatus for verifying a vehicle seat anti-pinch includes a base including a plurality of assembly holes for selecting an assembly position for a device that is assembled to an upper portion thereof by reflecting a package condition of a vehicle, a seat mounting unit assembled to the upper portion of the base through the assembly hole and in which the seat is mounted to the upper portion thereof, and at least one measurement unit assembled to the upper portion of the base through the assembly hole, and in which a pressure measuring device is movably mounted to a number of measuring points corresponding to main body parts of a passenger in a rear seat by a support structure assembled at a rear of the seat mounting unit and configured to measure a physical contact with the seat and a pressing force through the pressure measuring device.

In addition, the base may include a wheel portion assembled at a lower portion thereof for movement.

In addition, the seat mounting unit may include a support panel assembled to at least one assembly hole through a fastening member and a vertical support fixed on both sides of the base in a width direction of the base and on which the seat with an automated function of enabling one-touch posture switching applied is mounted on an upper portion thereof.

In addition, the measurement unit may include a first measurement unit configured to measure a pressing force by setting a first pressure measuring device to a plurality of measurement points corresponding to a knee position of the passenger in the rear seat and a second measurement unit configured to measure a pressing force by setting a second pressure measuring device to a plurality of measurement points corresponding to an instep or shin height position of the passenger in the rear seat.

In addition, the first pressure measuring device may include a first specimen being in physical contact with a seat back of the seat and in the shape of a hemisphere, a housing accommodating a rod connected to a center of the first specimen, and a load cell positioned at a lower portion of the rod and configured to measure the pressing force caused by the contact.

In addition, the second pressure measuring device may include a second specimen being in physical contact with a seat cushion of the seat and in the shape of a hemisphere, a housing accommodating a rod connected to a center of the second specimen, and a load cell positioned at a lower portion of the rod and configured to measure the pressing force caused by the contact.

In addition, the first specimen and the second specimen may be manufactured in various sizes to fit an average body size of a passenger taking into account at least one of a region of sale of the vehicle, age, and gender, and may be replaced and mounted according to measurement requirements upon verification of the seat.

In addition, the support structure may include a support panel assembled to the upper portion of the base, a vertical frame installed vertically on both sides in a width direction of the support panel, having a vertical direction rail formed on each side thereof, a horizontal frame movably mounted upward and downward, and through vertical rail brackets connected respectively to the vertical direction rails formed on the both sides and having a horizontal direction rail formed on one side thereof, and a mounting bracket mounted on the horizontal direction rail to be movable to the left and right through the horizontal rail bracket and having a forward and rearward direction rail formed on an upper surface thereof.

In addition, the support panel may be assembled at a certain distance apart from the seat mounting unit in consideration of front and rear distances of the seat referring to the package conditions of the vehicle.

In addition, the horizontal frame may be rotatably connected to the vertical rail brackets on both sides through angle adjustment plates configured at both ends thereof to adjust an angle of the pressure measuring device.

In addition, the angle adjustment plate may rotate relative to the horizontal frame as an axis, then adjust a desired angle, and be fixed by engaging the fastening member in the fixing hole.

In addition, the vertical rail bracket may be slidably mounted on the vertical direction rail and fixed by a fixing unit in such a manner that a damper fixed on a thread tightens the vertical direction rail by rotation of a lever.

In addition, the pressure measuring device may be mounted to be movable forward and rearward on the forward and rearward direction rail through a forward and rearward rail bracket formed on one surface of the housing.

In addition, the apparatus for verifying a vehicle seat anti-pinch may further include a controller configured to electrically connect the seat mounted on the seat mounting unit to operate a specific automation function and verify safety that satisfies a pinch determination reference value or less by detecting a pressing force through the measurement unit when being in contact with the seat in motion.

Meanwhile, according to another embodiment of the present disclosure, there is provided a method of verifying a vehicle seat anti-pinch. The method may include mounting a seat that is applied to a vehicle on a seat mounting unit assembled on an upper portion of a base, installing a first measurement unit and a second measurement unit corresponding to main body parts of a passenger in the rear seat on the upper portion of the base, respectively, by reflecting a package condition that includes a spacing between front and rear seats of a vehicle, fixing a first pressure measuring device to a passenger's knee position by adjusting a position of the first pressure measuring device through a support structure of the first measurement unit, fixing a second pressure measuring device to a passenger's instep or shin height position by adjusting a position of the second pressure measuring device through a support structure of the second measurement unit, operating an automation function of the seat by applying a hot key signal through a controller and determining whether there is a contact with the seat that is operating rearward through the first pressure measuring device and the second pressure measuring device, and determining whether a pinch occurs based on whether a reference value is exceeded by identifying a pressing force when a contact signal is received from the pressure measuring device.

In addition, the fixing of the first and second pressure measuring devices may include setting the first specimen and the second specimen to a knee position and an instep or shin height position by adjusting at least one position of upward and downward, left and right, forward and rearward positions, and angles of upward and downward rotation of the first specimen of the first pressure measuring device and the second specimen of the second pressure measuring device, through each of the support structures.

In addition, the determining whether the pinch occurs may include determining that a passenger's body is pinched when the pressing force exceeds a reference value when the automated function operates.

In addition, the determining of the passenger's body being pinched may include notifying that the pinching has occurred at at least one of the knee position and the instep or shin height position of the passenger according to a subject transmitting the contact signal and converting a degree of pinching according to the pressing force into a database format and storing the degree of pinching into the database.

In addition, after the determining whether the pinch occurs, the method may further include identifying whether the verification of all automation functions applied to the seat has been completed through the controller and operating a next queued automation function and identifying whether there is a contact with the seat that is operating rearward through the first pressure measuring device and the second pressure measuring device when the verification of all automation functions has not been completed.

In addition, identifying whether the verification of all automation functions has been completed may include ending the verification when all automation functions have been verified and generating a verification result report based on the data stored in the database according to a result of the automation function verification of the seat.

According to an embodiment of the present disclosure, there is an effect of performing the anti-pinch verification for the automation functions applied to the seat by reflecting the seat package conditions of various vehicles on the behalf of the main body parts of the passenger in the rear seat by freely adjusting the specimen position of the measurement unit upward and downward, left and right, forward and rearward, and at various angles.

In addition, there is an effect of performing the anti-pinch verification applied according to the measurement requirements of the sales region by replacing and mounting the specimen of the measurement unit with sizes suitable for various body sizes.

In addition, by adjusting the front and rear distances from the seat, there is an effect that it is possible to perform the anti-pinch verification for multi-vehicle seats, which can assist in designing the shape of the seat and securing the rear space for safety.

BRIEF DESCRIPTION OF THE DRAWINGS

FIGS. 6A-6C and 7A-7C illustrate a method of operating the first measurement unit according to a first embodiment of the present disclosure.

FIGS. 9A and 9B illustrate a method of operating the second measurement unit according to an embodiment of the present disclosure.

FIGS. 10 and 11 illustrate a specimen size considering height averages of the knee, the instep, or the shin of a human body, according to an embodiment of the present disclosure.

DETAILED DESCRIPTION OF ILLUSTRATIVE EMBODIMENTS

Figure 1:
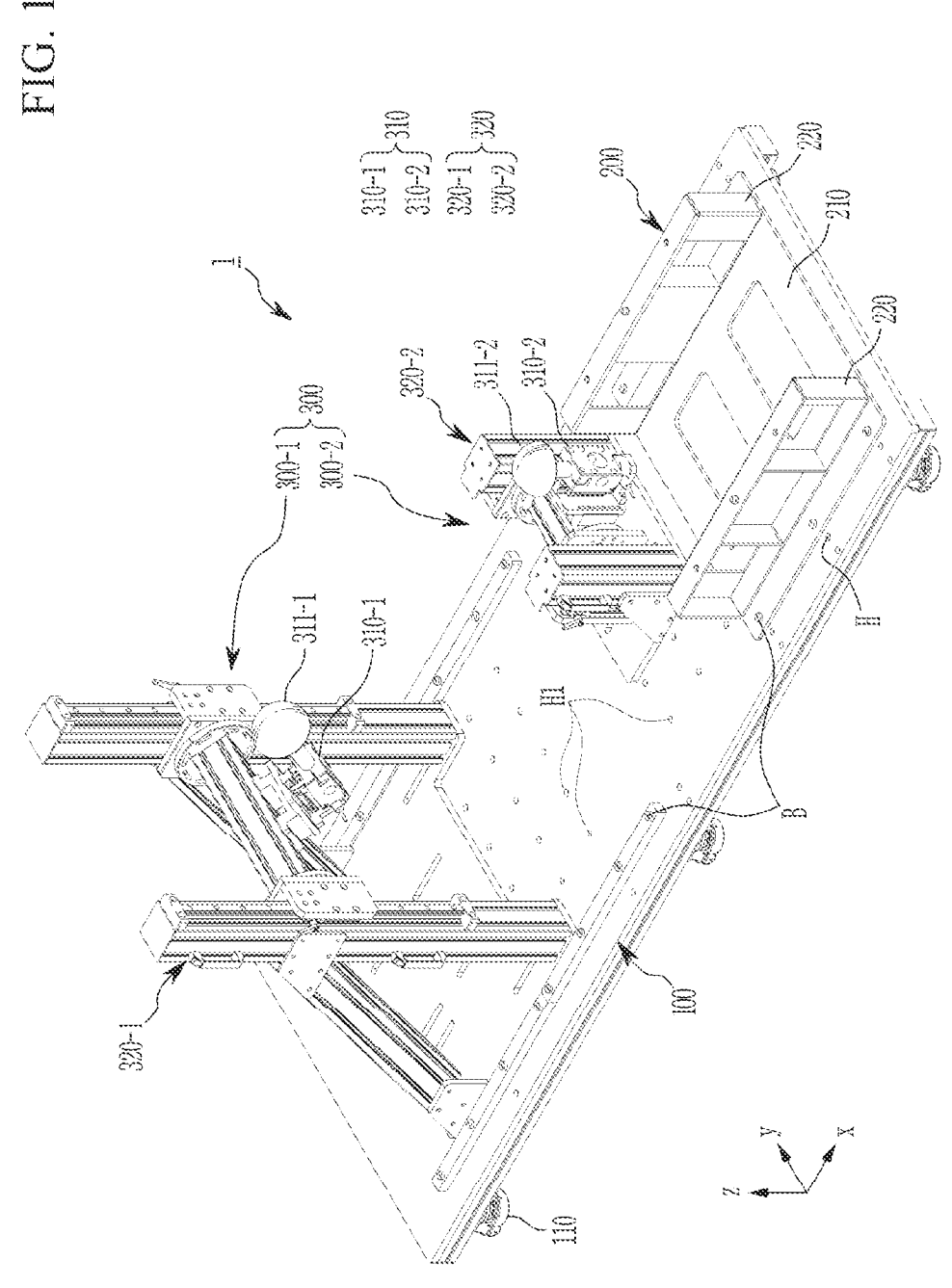
FIG. 1 is a perspective view schematically illustrating an apparatus for verifying a vehicle seat anti-pinch, according to an embodiment of the present disclosure.

Hereinafter, embodiments of the present disclosure will be described in detail with reference to the accompanying drawings so that those skilled in the technical field to which the present invention pertains may easily carry out the embodiments.

The terms used herein are merely for the purpose of describing a specific embodiment, and not intended to limit the present disclosure. The singular expressions used herein are intended to include the plural expressions unless the context clearly dictates otherwise. It is to be understood that the term "comprise (include)" and/or "comprising (including)" used in the present specification means that the features, the integers, the steps, the operations, the constituent elements, and/or the components are present, but the presence or addition of one or more of other features, integers, steps, operations, constituent elements, components, and/or groups thereof is not excluded. The term "and/or" used herein includes any one or all the combinations of listed related items.

Throughout the specification, the terms such as "first," "second," "A," "B," "(a)," "(b)," and other numerical terms may be used herein only to describe various elements, but these elements should not be limited by these terms. These terms are used only for the purpose of discriminating one constituent element from another constituent element, and the nature, the sequences, or the orders of the constituent elements are not limited by the terms.

Throughout the specification, when one constituent element is described as being "connected" or "coupled" to another constituent element, it should be understood that one constituent element can be connected or coupled directly to another constituent element, and an intervening constituent element can also be present between the constituent elements. When one constituent element is described as being "connected directly to" or "coupled directly to" another constituent element, it should be understood that no intervening constituent element is present between the constituent elements.

Additionally, it is understood that one or more of the following methods or aspects thereof may be executed by one or more controllers. The term "controller" can refer to a hardware device that includes a memory and a processor. The memory is configured to store program instructions, and the processor is specifically programmed to execute the program instructions to perform one or more of the processes described in more detail below. The controller may control the operation of units, modules, components, devices, or the like, as described herein. In addition, it is understood that the methods below may be carried out by an apparatus comprising the controller in conjunction with one or more other components, as recognized by those skilled in the art.

An apparatus for verifying a vehicle seat anti-pinch and a method thereof according to embodiments of the present disclosure will be described in detail with reference to the drawings.

FIG. 1 is a perspective view schematically illustrating an apparatus for verifying a vehicle seat anti-pinch, according to an embodiment of the present disclosure.

Figure 2:
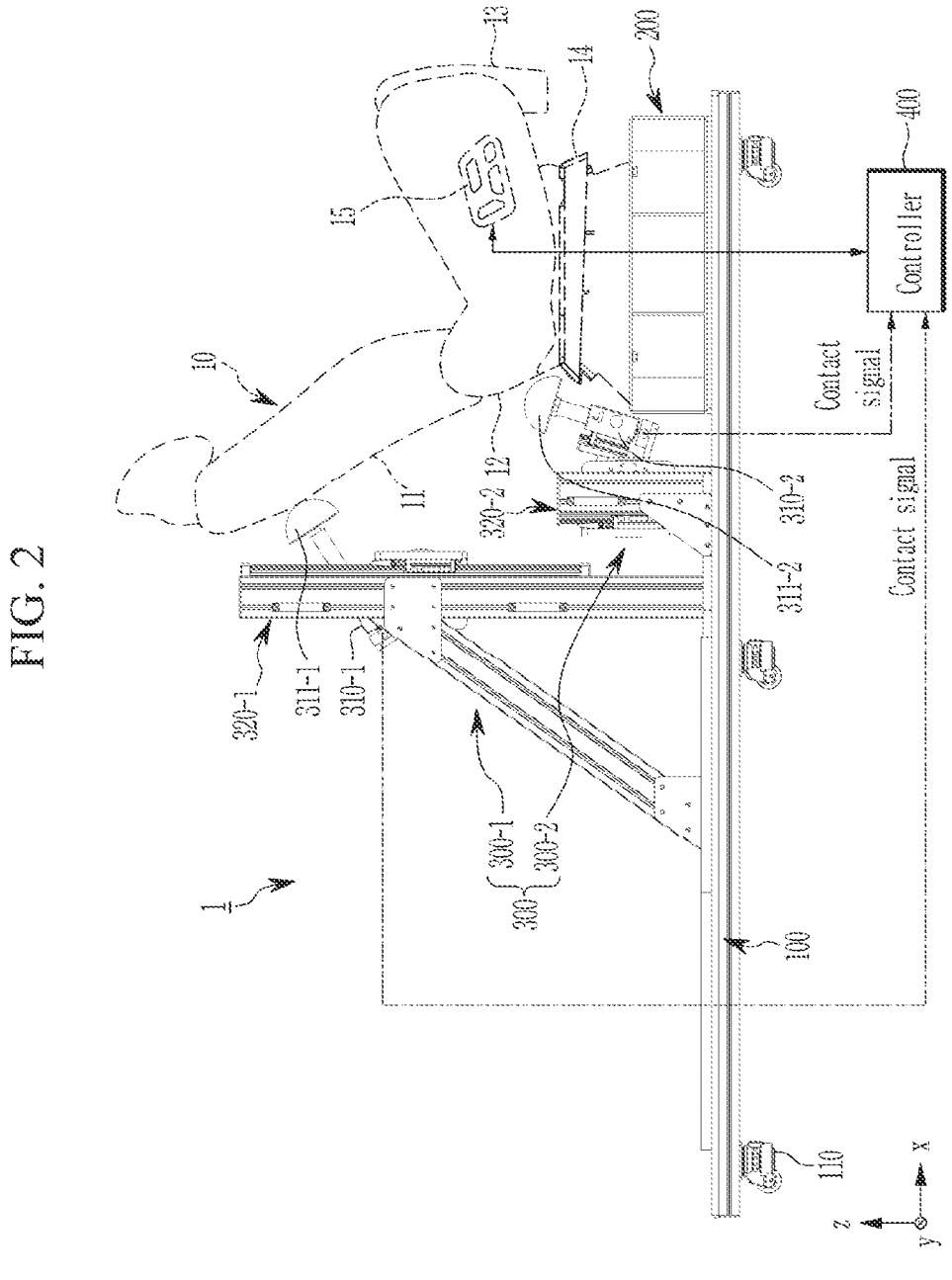
FIG. 2 is a side view illustrating that a seat is mounted on the apparatus for verifying a vehicle seat anti-pinch, according to an embodiment of the present disclosure.

FIG. 2 is a side view illustrating that a seat is mounted on the apparatus for verifying a vehicle seat anti-pinch, according to an embodiment of the present disclosure.

With reference to FIGS. 1 and 2, an apparatus 1 for verifying a vehicle seat anti-pinch according to an embodiment of the present disclosure includes a base 100, a seat mounting unit 200, and a measurement unit 300 that are configured to enable verification of an anti-pinch logic of a seat 10 by reflecting various package conditions of vehicles. The package conditions may include an operating angle and a shape of the seat 10, a physical distance between front and rear seats, a passenger's posture, a luggage position, and the like.

The base 100 is a flat panel and includes a plurality of assembly holes H1 for selecting an assembly position for a device assembled to an upper portion thereof by reflecting the package conditions of a vehicle. For example, the seat mounting unit 200 and the measurement unit 300 are assembled to the assembly hole H1 present in a required setting position in the upper portion of the base 100 through the fastening member B. The fastening member B may be a fixing pin, bolt, or screw that is inserted into the assembly hole H1.

The base wo may include a wheel portion no assembled at a lower portion thereof to move the apparatus 1. The wheel portion no may be assembled through the assembly hole H1 and the fastening member B formed in the lower portion of the base 100.

The seat mounting unit 200 is assembled to one end of the base 100 and the seat 10 is mounted to an upper portion thereof.

The seat mounting unit 200 includes a support plate 210 assembled in at least one assembly hole H1 through the fastening member B and a vertical support 220 fixed to both sides of the base 100 in a width direction and configured to mount the seat 10 with an automation function that allows a one-touch posture switch in an upper portion of the seat 10. The seat mounting unit 200 may interchangeably mount various types of seats 10 according to various types of vehicles and/or specifications.

The vertical support 220 may adjust a spacing in a width direction depending on a position in which the vertical support 220 is assembled in the assembly hole H1 formed in the support plate 210.

Here, the seat 10 is an electric powered multi-functional seat that includes a seat back 11, a seat cushion 12, a leg rest 13, a seat rail 14, and an operation switch 15. For example, the seat 10 may be applied to a front seat, such as a driver's seat or a passenger's seat, to automatically perform a posture switching, such as relax and easy access, with a single touch (hotkey) of the operation switch 15. The seat 10 is installed on the seat rail 14 the same as in an in-vehicle installation environment, allowing the seat cushion 12 to move forward and backward and the seat back 11 to be adjusted at an angle.

When the automation functions of the seat 10 are activated, the seat back 11 and the seat cushion 12 may interfere with (come into contact with) a body of a passenger in the rear seat as they move backward. In particular, anti-pinch verification logic is required for safety, as the knees, insteps, or shins of the passengers in the rear seats may get pinched by the seat back 11 or the seat cushion 12 that is operating rearward.

As described above, the description of the measurement unit 300 for anti-pinch verification continues with the full understanding that there is a risk of interference with major body parts (knees and insteps or shins) of the passenger in the rear seat when the multifunctional seat 10 is applied to the vehicle.

A pressure measuring device 310 is mounted to the measurement unit 300 by a support structure 320 assembled on the upper portion of the base 100 at a rear of the seat mounting unit 200 so that the pressure measuring device 310 is able to move to a plurality of measurement points (positions) corresponding to major body parts of the passenger in the rear seat. Therefore, the measurement unit 300 measures a physical contact with and a pressing force to the seat 10 through the pressure measuring device 310.

Figure 3:
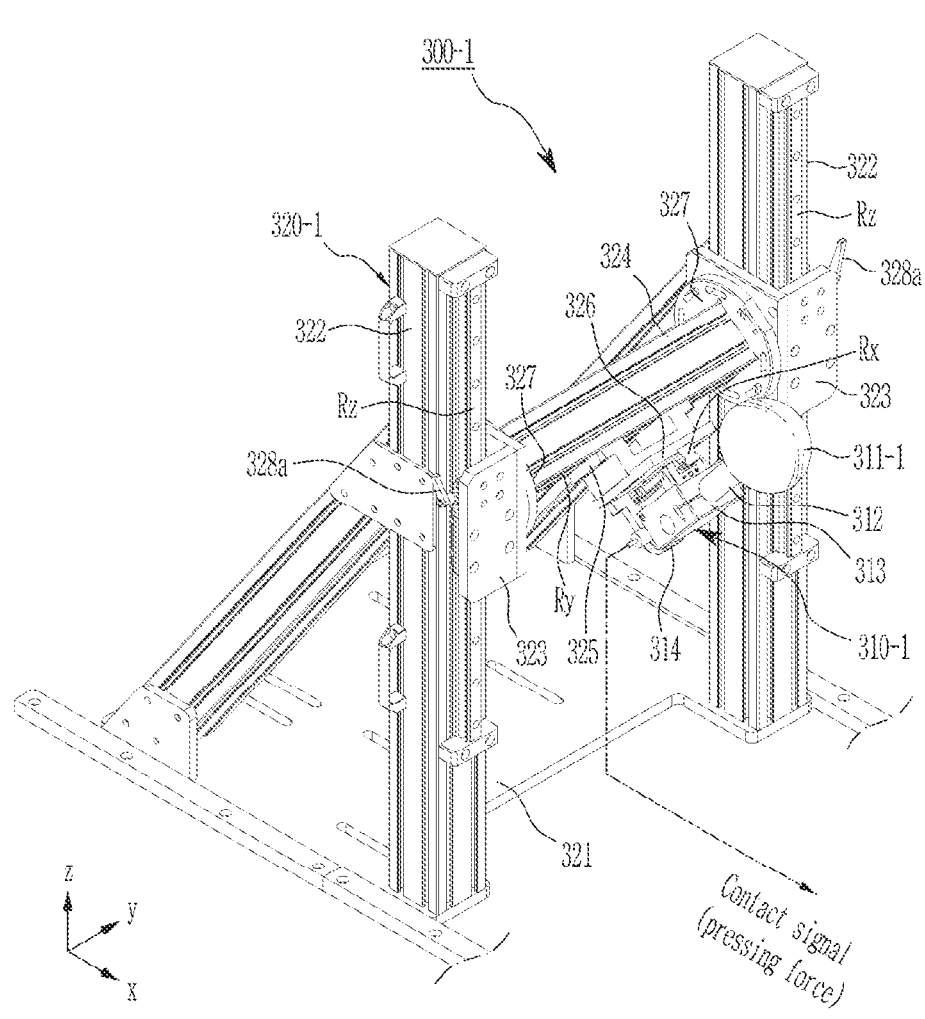
FIGS. 3 and 4 are views illustrating a configuration of a first measurement unit corresponding to the knee of a passenger and a second measurement unit corresponding to the instep or the shin, according to an embodiment of the present disclosure.
Figure 4:
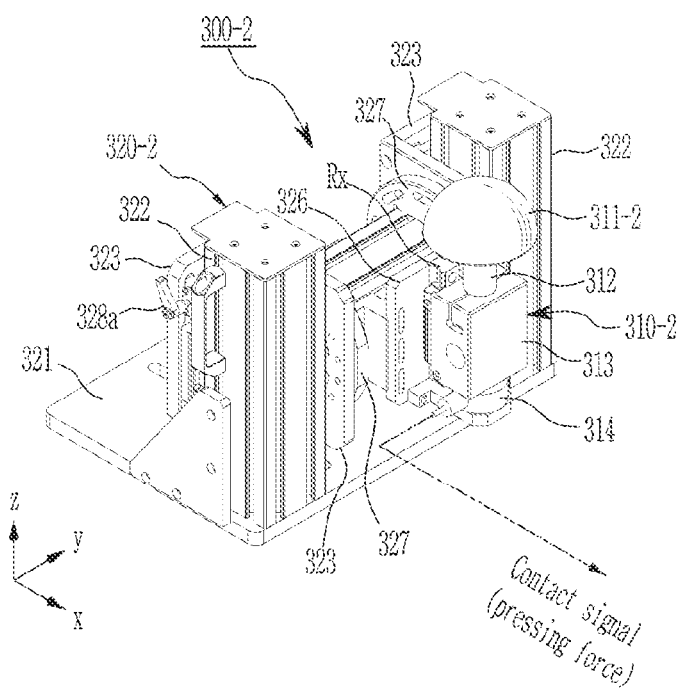

FIGS. 3 and 4 are views illustrating a configuration of a first measurement unit corresponding to the knee of a passenger and a second measurement unit corresponding to the instep or the shin, according to an embodiment of the present disclosure.

Figure 5:
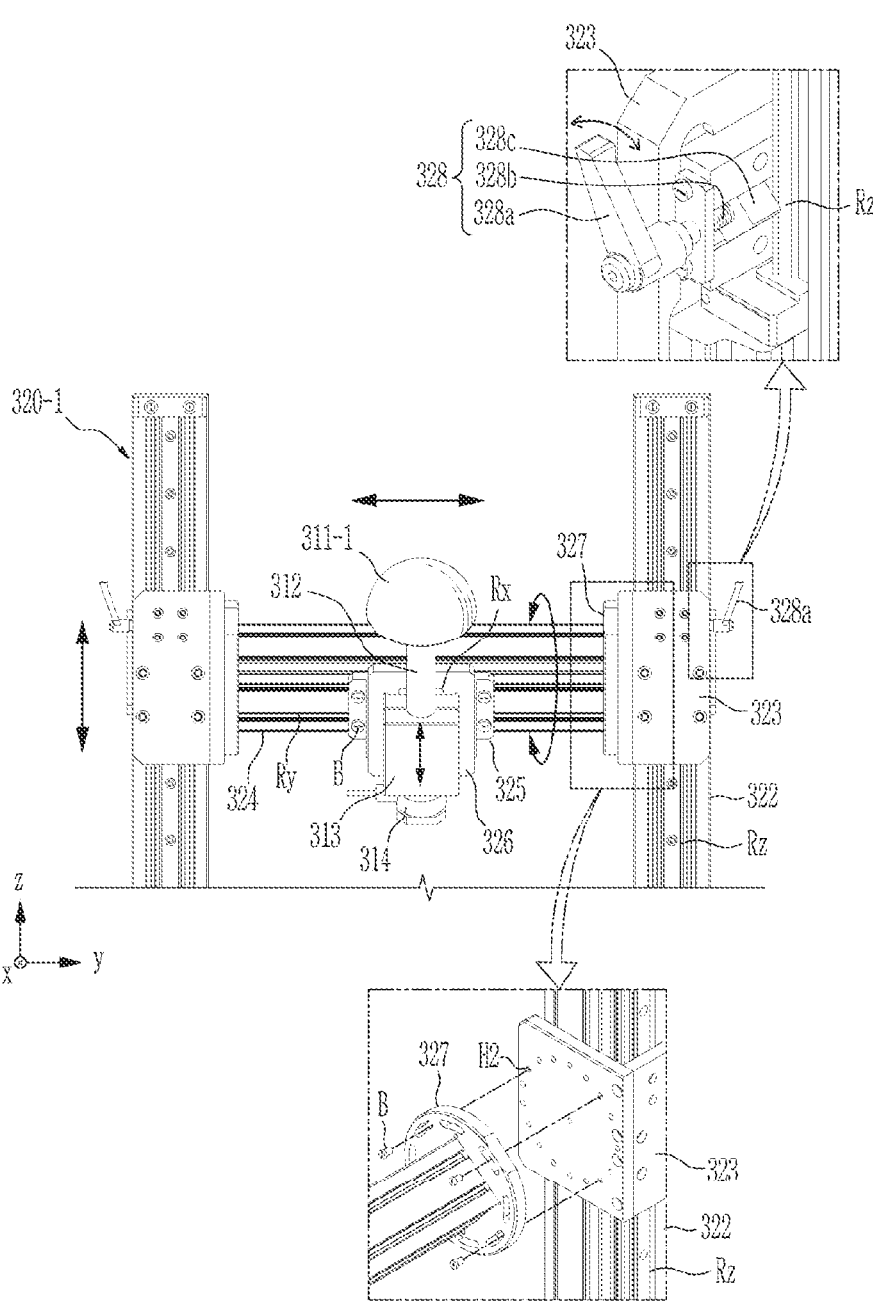
FIG. 5 is a view illustrating a position adjusting structure of a pressure measuring device according to an embodiment of the present disclosure.
Figure 6A:
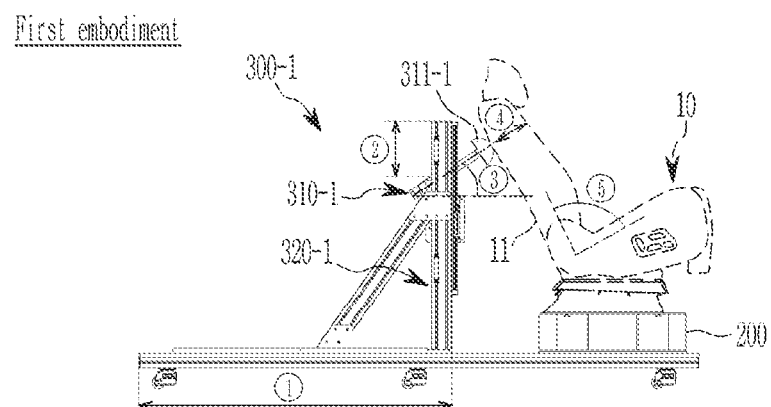
Figure 6B:
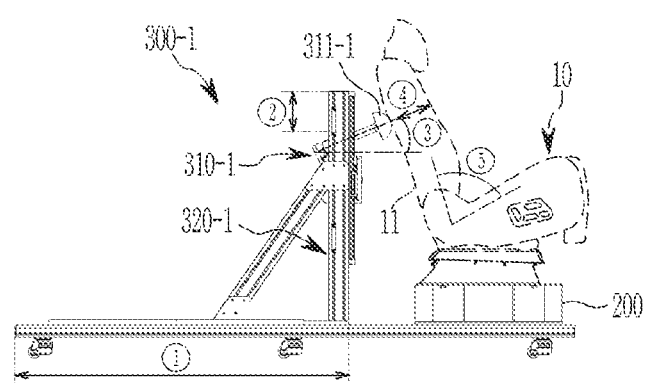
Figure 6C:
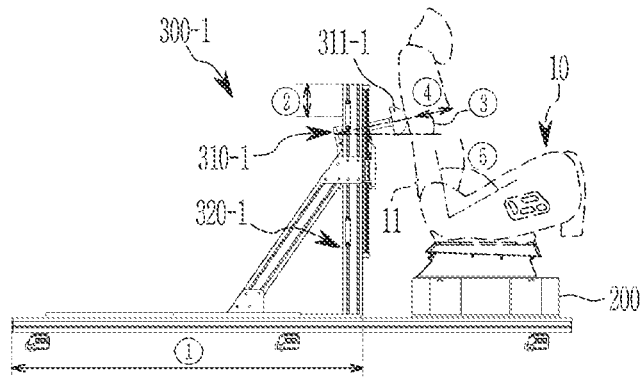

FIG. 5 is a view illustrating a detailed configuration of a support structure according to an embodiment of the present disclosure.

With reference to FIGS. 3 to 5, the measurement unit 300 includes a first measurement unit 300-1 that measures a pressing force by setting a first pressure measuring device 310-1 to multiple measurement points corresponding to a knee position of the passenger in the rear seat and a second measurement unit 300-2 that measures a pressing force by setting a second pressure measuring device 310-2 to multiple measurement points corresponding to an instep or shin height position of the passenger in the rear seat.

The first measurement unit 300-1 and the second measurement unit 300-2 have a similar structure that includes the pressure measuring devices 310-1 and 310-2 and the support structure 320 thereof, which differ only in size depending on the measurement position, due to the characteristics in that the first measurement unit 300-1 and the second measurement unit 300-2 measure that the seat 10 is in contact therewith (interferes therewith) on behalf of the knee, the instep, or the shin, respectively, when the seat 10 is in motion. Therefore, when describing the measurement unit 300 hereinafter, a configuration of the first measurement unit 300-1 will be described primarily, so that the second measurement unit 300-2 can be understood to be configured in the same manner as the first measurement unit 300-1.

The first measurement unit 300-1 is assembled on the upper surface of the first pressure measuring device 310-1 and the base 100, which are formed by reflecting the knee size (circumference) and position of the body, and includes the support structure 320 in which the first pressure measuring device 310-1 is mounted as a mechanical structure that is capable of being adjusted upward and downward, left and right, forward and backward, and at an angle.

Hereinafter, for understanding of the description, the support structure 320 will be referred to separately as a first support structure 320-1 that is provided in the first measurement unit 300-1 and a second support structure 320-2 that is provided in the second measurement unit 300-2.

The first pressure measuring device 310-1 includes a first specimen 311-1 in the shape of a hemisphere that is in physical contact with the seat back 11 of the seat 10 moving rearward, a housing 313 that accommodates a rod 312 connected to the center of the first specimen 311-1, and a load cell 314 positioned at a lower portion of the rod 312 to measure a pressing force caused by the contact. The first specimen 311-1 is coupled with a leading end of the rod 312 in a screwed manner. The first specimen 311-1 and the second specimen 311-2 described below are manufactured in various sizes to fit a body size of the passenger taking into account at least one of the sales region (country) of the vehicle, age, and gender (male/female), and may be replaced and mounted according to measurement requirements.

The first support structure 320-1 includes a support panel 321 assembled on the upper portion of the base 100, a vertical frame 322 installed vertically on both sides in a width direction of the support panel 321 and having a vertical direction rail Rz formed on each surface thereof, a horizontal frame 324 mounted to be movable upward and downward through vertical rail brackets 323 connected to each of the vertical direction rails Rz on the both sides and having a horizontal direction rail Ry formed on one surface thereof, and a mounting bracket 326 mounted to be movable upward and downward on the horizontal direction rail Ry through a horizontal rail bracket 325 and having a forward and backward direction rail Rx formed on an upper surface thereof.

The support panel 321 may be assembled at a certain distance apart from the seat mounting unit 200, taking into account the front and rear distances of the seat 10 referenced to the package conditions (or design data) of the seat for the vehicle. Accordingly, the distance of the measurement unit 300 from the seat mounting unit 200 may be changed to perform a test by reflecting the package conditions of the type of vehicle.

The horizontal frame 324 is rotatably connected to the vertical rail brackets 323 on both sides thereof, respectively, through angle adjustment plates 327 configured at both ends of the horizontal frame 324 and may adjust an angle of the first pressure measuring device 310-1. The angle adjustment plate 327 may be rotated relative to the horizontal frame 324 as an axis to adjust a desired angle and then fixed by engaging the fastening member B in a fixing hole H2. In contrast, when the engagement is released, the fixation is released, so that the angle of the first pressure measuring device 310-1 may be adjusted through rotation of the horizontal frame 324.

The vertical rail bracket 323 is slidably mounted on the vertical direction rail Rz and may be fixed by a fixing unit 328 in such a manner that a polygonal damper 328*c* fixed to a thread 328*b* tightens the vertical direction rail Rz by rotation of a lever 328*a*. In contrast, when the lever 328*a* is released, the fixation is released and the vertical rail bracket 323 is capable of moving upward and downward.

The horizontal rail bracket 325 is slidably mounted on the horizontal direction rail Ry and may be fixed in such a manner that the horizontal direction rail Ry is tightened by engaging the fastening member B in the fixing holes H2 formed on both sides thereof. Conversely, when the engagement is released, the fixation is released, and the horizontal rail bracket 325 is capable of moving in the horizontal direction.

In addition, the first pressure measuring device 310-1 is mounted to be slidingly movable forward and backward on the forward and backward direction rail Rx of the mount bracket 326 through a forward and backward rail bracket 325 formed on one surface of the housing 313.

Like the first measurement unit 300-1, the second measurement unit 300-2 includes a second pressure measuring device 310-2 formed by reflecting the instep or shin height position of the body and a second support structure 320-2 assembled on the upper surface of the base 100 and mounting the second pressure measuring device 310-2 as a mechanical structure that is adjustable upward and downward, left and right, forward and backward, and at an angle.

The second pressure measuring device 310-2 includes a second specimen 311-2 in the shape of a hemisphere that is in physical contact with the seat cushion 12 of the seat 10 moving rearward, a housing 313 that accommodates the rod 312 connected to the center of the second specimen 311-2, and the load cell 314 positioned at the lower portion of the rod 312 to measure a pressing force caused by the contact.

The second support structure 320-2 may include the support panel 321, the vertical frame 322, the vertical rail bracket 323, the horizontal frame 324, the horizontal rail bracket 325, the mount bracket 326, and the angle adjustment plates 327, the same as the first support structure 320-1 described above.

Further, the second pressure measuring device 310-2 is movably mounted on the forward and backward direction rail Rx of the mount bracket 326 through a forward and backward rail bracket 325 formed on one surface of the housing 313.

Meanwhile, a method of operating the first and second measurement units 300-1 and 300-2 will be described when the apparatus 1 according to an embodiment of the present disclosure is mounted with various shapes of seats.

FIGS. 6A-6C and 7A-7C illustrate a method of operating the first measurement unit according to a first embodiment of the present disclosure.

With reference to FIGS. 6A-6C and 7A-7C, the first measurement unit 300-1 according to the first embodiment of the present disclosure changes the position of the first specimen 311-1 in contact with the seat back 11 of the seat 10 by adjusting the position of the first pressure measuring device 310-1 in the upward and downward directions, in the leftward and rightward directions, and in the frontward and rearward directions and by adjusting an angle of rotation upward and downward through the support structure 320.

In this case, the first measurement unit 300-1 may ① adjust a spacing from the seat according to the position of the support panel 321 assembled on the base 100, ② adjust a height according to the fixed position of the horizontal frame 324, which is movable upward and downward along the vertical frame 322, ③ adjust an angle through the angle adjustment plates 327 configured at both ends of the horizontal frame 324 and finely adjust a spacing from the seat 10 according to the fixed position of the first pressure measuring device 310-1, which is movable in the forward and rearward directions through the forward and rearward direction rail Rx formed on the mounting bracket 326.

The first measurement unit 300-1 may change the position of the first specimen 311-1 in contact with the seat back 11 through at least one of the adjustments, such as to a higher position (FIG. 6A), a middle position (FIG. 6B), a lower position (FIG. 6C), or the like. Here, the first measurement unit 300-1 may further ⑤ adjust a sliding position of the seat 10 and an angle of the seat back 11 to identify whether there is interference with the first specimen 311-1 in various postures and which postures are possible to operate without interference.

In addition, with reference to FIGS. 7A-7C, the first measurement unit 300-1 can measure a change in a position in which the first specimen 311-1 is in contact with the seat back 11 while changing the position of the first pressure measuring device 310-1 to the left side (FIG. 7A), the center (FIG. 7B), the right side (FIG. 7C), and the like through the mount bracket 326 that moves to the left and right along the horizontal frame 324. Therefore, a situation where the interference occurs due to the rear surface shape of the seat back 11 may be identified and an improved design may be derived.

Figure 8A:
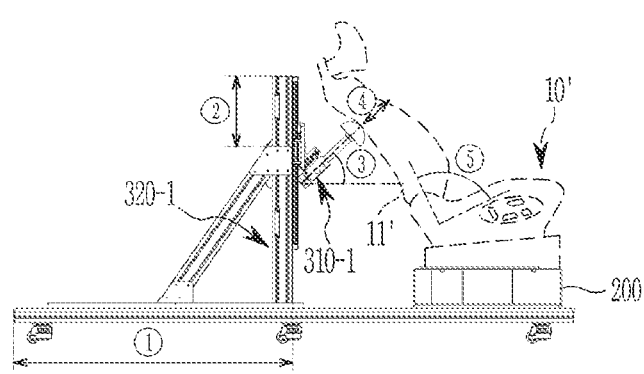
FIGS. 8A-C illustrate a method of operating the first measurement unit according to a second embodiment of the present disclosure.
Figure 8B:
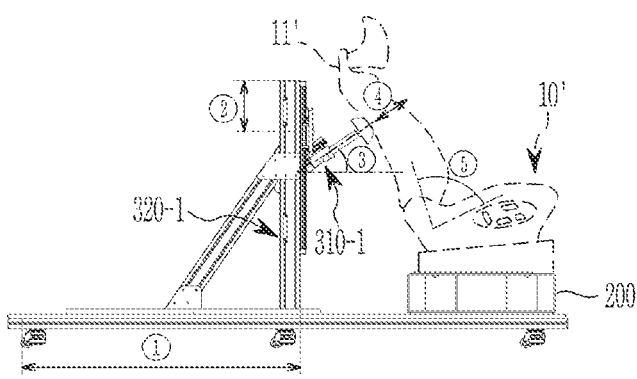
Figure 8C:
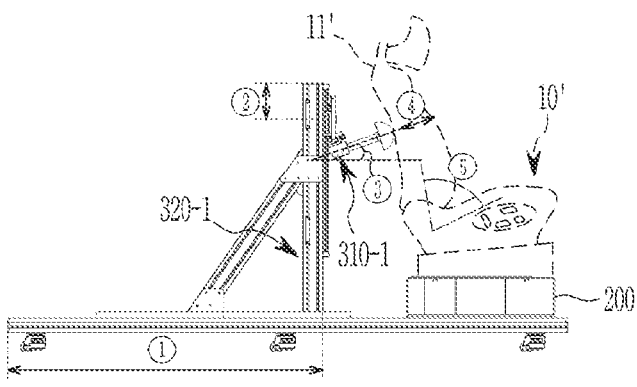

FIGS. 8A-8C illustrate a method of operating the first measurement unit according to a second embodiment of the present disclosure.

With reference to FIGS. 8A-8C, a second embodiment of the present disclosure shows a state in which a different type of seat 10' with a different shape than the first embodiment is replaced and mounted on the seat mounting unit 200, but an operation method is the same.

Like the first embodiment, the first measurement unit 300-1 according to the second embodiment of the present disclosure may change the position of the first specimen 311-1 in contact with the seat back 11 of the seat 10 by adjusting the position of the first pressure measuring device 310-1 in the upward and downward directions, in the leftward and rightward directions, and in the frontward and rearward directions and by adjusting an angle of rotation upward and downward through the support structure 320.

In this case, the first measurement unit 300-1 is adjusted by the same mechanism as ① to ⑤ described above, but the first specimen 311-1 changes in the upward and downward, forward and backward, and left and right positions due to the difference in the rear surface shape of the different type of seat back if.

In addition, by the same mechanism as ⑥ described above, it is possible to measure the change in position in which the first specimen 311-1 is in contact with the different type of seat back if by changing the position of the first pressure measuring device 310-1 to the left and right through the mounting bracket 326, which moves to the left and right along the horizontal frame 324 (see FIGS. 7A-7C).

Meanwhile, FIG. 9 illustrates a method of operating the second measurement unit according to an embodiment of the present disclosure.

Figures 9A, 9B:
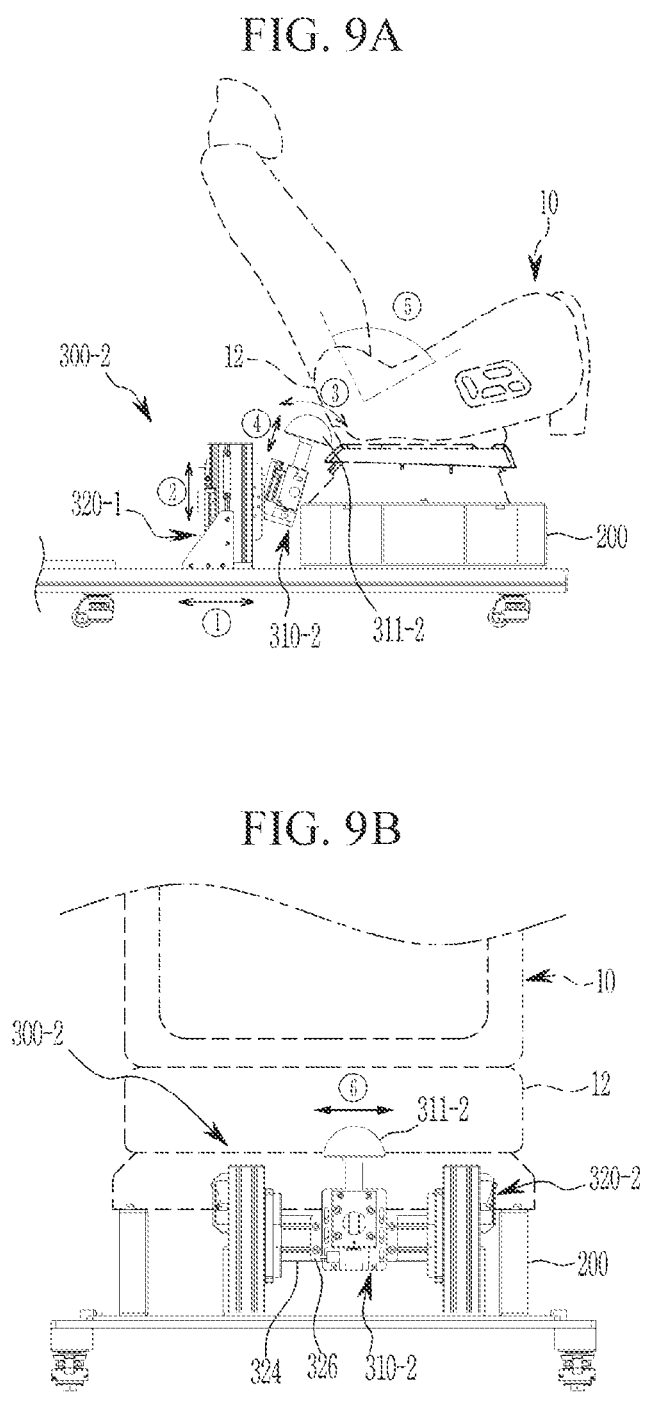

With reference to FIG. 9A, since the second measurement unit 300-2 differs from the first measurement unit 300-1 only in size depending on the measurement position and has the same support structure 320, the second measurement unit 300-2 may change the position of the second specimen 311-2 in contact with the seat cushion 12 of the seat 10 by adjusting the upward and downward, left and right, and forward and backward positions of the second pressure measuring device 310-2 and by adjusting the angle of rotation upward and downward in the same manner of the first measurement unit 300-1.

That is, like the method of operating the first measurement unit 300-1 described above, the second measurement unit 300-2 may be adjusted by the same mechanism as ① to ⑤ as described above, and when measuring the seat 10 and the different type of seat, the upward and downward, forward and backward, and left and right positions of the second specimen 311-2 vary due to the difference in the shape of the different seat cushions.

In addition, with reference to FIG. 9B, by the same mechanism as ⑥ described above, it is possible to measure the change in position in which the second specimen 311-2 is in contact with the seat cushion 12 by changing the position of the second pressure measuring device 310-2 to the left and right through the mounting bracket 326, which moves to the left and right along the horizontal frame 324.

Meanwhile, the size of a hemispherical dummy in the first specimen 311-1 and the second specimen 311-2, which apply to the first measurement unit 300-1 and the second measurement unit 300-2, respectively, may be replaced and mounted in accordance with the measurement requirements. The measurement requirements may change depending on the vehicle's sales region (e.g., Korea, US, Europe, etc.), the required body model (e.g., 95, 50, 5% tile dummy, 6-year-old standard, etc.), and the body position (knee, instep, or shin).

For example, FIGS. 10 and 11 illustrate a specimen size considering height averages of the knee and the instep of the body, according to an embodiment of the present disclosure.

With reference to FIGS. 10 and 11, the average knee circumference (57.42 mm) and the average instep height (52.88 mm) of males and females in Korea are shown (referring to the measurement data of instep height for the 6th year of the National Institute of Standards and Technology—Size Korea).

Based on these data, a hemispherical dummy of the first specimen 311-1 may be mounted with a radius R of 57 mm, and a hemispherical dummy of the second specimen 311-2 may be mounted with a radius R of 53 mm to verify the anti-pinch logic of the seat applied to a vehicle sold domestically.

However, the size of the specimen is not limited to the sizes described above, and other specimens of customized sizes manufactured to meet the measurement requirements of different regions are further provided and may be replaced and mounted as necessary.

As described above, the first pressure measuring device 310-1 and the second pressure measuring device 310-2 are installed so that they may move upward and downward (vertically), left and right (horizontally), and forward and backward, as well as adjust the angle of rotation upward and downward through the respective support structures 320 in order to enable measurement of pinching in response to motion of the seat 10 at multiple measurement points corresponding to the knee position and the instep or shin height position of the passenger.

Therefore, the first measurement unit 300-1 and the second measurement unit 300-2 may set the positions of the first specimen 311-1 of the first pressure measuring device 310-1 and the second specimen 311-2 of the second pressure measuring device 310-2 in consideration of the seat package conditions (e.g., a space between the front and rear seats) applied to the vehicle and the passenger in the rear seat.

In addition, the risk level according to the degree of interference may be predicted by detecting whether the seat 10 is in contact with the passenger and the pressing force through a controller 400, while changing the setting position of the first specimen 311-1 and the second specimen 311-2 to multiple measurement points for verifying the anti-pinch logic of the seat applied to the vehicle.

Meanwhile, as illustrated in FIG. 2, the apparatus 1 according to an embodiment of the present disclosure may further include the controller 400 that electrically connects the seat 10 mounted on the seat mounting unit 200 to operate a specific function and verifies the safety that satisfies a pinch determination reference value or less by detecting a pressing force when being in contact with the seat 10 in operation through a measurement unit 300.

The controller 400 may be configured as a computer system including at least one program and data for verifying the anti-pinch for the vehicle seat according to an embodiment of the present disclosure.

The controller 400 may be connected to the load cells 314 of the first pressure measuring device 310-1 and the second pressure measuring device 310-2, respectively, to collect the measured contact of the seat 10 and the pressing force.

The controller 400 may be implemented as one or more processors operating under a configured program, and the configured program may be one that is programmed to perform each step of the method of verifying a vehicle seat anti-pinch according to an embodiment of the present disclosure.

Figure 12:
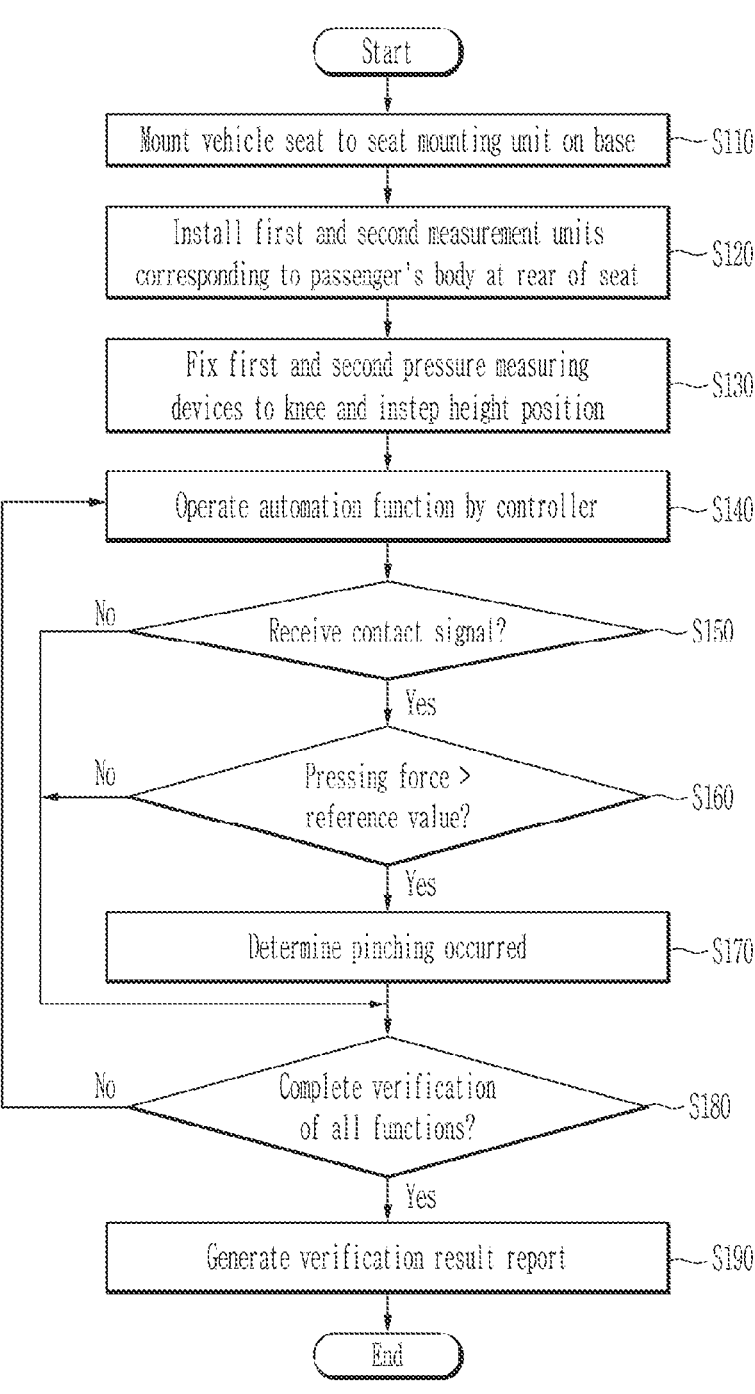
FIG. 12 is a flowchart schematically illustrating a method of verifying a vehicle seat anti-pinch, according to an embodiment of the present disclosure.

FIG. 12 is a flowchart schematically illustrating a method of verifying a vehicle seat anti-pinch, according to an embodiment of the present disclosure.

With reference to FIG. 12, the seat 10 applicable to a specific vehicle is mounted on the seat mounting unit 200 assembled to the upper portion of the base 100 of the apparatus 1 for verifying a seat anti-pinch (S110).

The first measurement unit 300-1 and the second measurement unit 300-2 corresponding to the main body parts of the passenger in the rear seat in the rear of the seat 10 are installed on the upper portion of the base 100 by reflecting the package condition including the spacing between the front and rear seats of the vehicle (S120).

The first pressure measuring device 310-1 is fixed to the passenger's knee position by adjusting the position of the first pressure measuring device 310-1 through the support structure 320 of the first measurement unit 300-1, and the second pressure measuring device 310-2 is fixed at the passenger's instep or shin height position by adjusting the position of the second pressure measuring device 310-2 through the support structure 320 of the second measurement unit 300-2 (S130). In this case, the first specimen 311-1 and the second specimen 311-2 may be set to the knee position and the instep or shin height position by adjusting the first specimen 311-1 of the first pressure measuring device 310-1 and the second specimen 311-2 of the second pressure measuring device 310-2 to at least one of the positions of upward and downward, left and right, forward and backward, and angle, through the respective support structures 320.

The controller 400 operates the automation functions by applying a hot key signal to the seat 10 in a state in which the first specimen 311-1 of the first pressure measuring device 310-1 and the second specimen 311-2 of the second pressure measuring device 310-2 are set in the knee position and the instep or shin height position of the passenger, respectively (S140). For example, the controller 400 may sequentially operate the automation functions that includes the relax or easy access applied to the seat 10.

Hereafter, the description will be followed assuming that the relax function is activated.

The controller 400 determines whether a contact signal with the seat 10 moving rearward is received through the first pressure measuring device 310-1 and the second pressure measuring device 310-2 when the automation function (the relax function) is operating (S150). By the determination described above, whether the seat 10 is interfering may be identified.

In this case, the controller 400 determines whether the pressing force of the contact signal exceeds a reference value upon receiving the contact signal from at least one of the first pressure measuring device 310-1 and the second pressure measuring device 310-2 (Yes in S150) (S160). By the determination described above, whether a pinch has occurred may be determined.

That is, the controller 400 determines that the passenger's body is pinched when the automation function (the relax function) is operating when the pressing force exceeds the reference value (Yes in S160) (S170).

In this case, the controller 400 may notify that the pinching has occurred in at least one of the knee position and the instep or shin height position of the passenger depending on a subject that transmitted the contact signal. Further, the degree of pinching (intensity) according to the pressing force may be identified, converted into a database format, and stored in the database (DB).

The controller 400 determines whether the verification of all automation functions applied to the seat 10 has been completed (S180). In this case, the controller 400 returns to step S140 to activate a next queued automation function (e.g., easy access) if the verification of all automation functions has not been completed (No in S180). Further, upon operating the next automation function, the controller 400 may determine whether there is a contact with the seat that is operating rearward through the first pressure measuring device and the second pressure measuring device.

In contrast, the controller 400 may end the verification and generate a verification result report based on the data-based data if the verification of all automation functions applied to the seat 10 has been completed (Yes in S180) (S190). The verification result report generated as described above may be utilized to secure the rear space of the seat 10 and develop the shape of the seat that is required when operating the corresponding automation functions.

Meanwhile, the controller 400 verifies the stability of the automation function (the relax) and proceeds to step S180 when the contact signal is not received at step S150 (No in S150) or the pressing force does not exceed the reference value at step S160 (No in S160).

As described above, according to an embodiment of the present disclosure, there is an effect of performing the anti-pinch verification for the automation functions applied to the seat by reflecting the seat package conditions of various vehicles on the behalf of the main body parts of the passenger in the rear seat by freely adjusting the specimen position of the measurement unit upward and downward, left and right, forward and rearward, and at various angles.

In addition, there is an effect of performing the anti-pinch verification applied according to the measurement requirements of the sales region by replacing and mounting the specimen of the measurement unit with sizes suitable for various body sizes.

In addition, by adjusting the front and rear distance from the seat, there is an effect that it is possible to perform the anti-pinch verification for multi-vehicle seats, which can assist in designing the shape of the seat and securing the rear space for safety.

The exemplary embodiments of the present disclosure are not implemented only by an apparatus and a method as described above. Based on the above-mentioned descriptions of the exemplary embodiments, those skilled in the art to which the present disclosure pertains may easily realize the exemplary embodiments through programs for realizing functions corresponding to the configuration of the exemplary embodiments of the present disclosure or recording media on which the programs are recorded.

Although the exemplary embodiments of the present disclosure have been described in detail herein above, the right scope of the present disclosure is not limited thereto, and it should be clearly understood that many variations and modifications made by those skilled in the art using the basic concept of the present disclosure which is defined in the following claims, will also belong to the right scope of the present disclosure.

What is claimed is:

1. An apparatus for verifying a vehicle seat anti-pinch, the apparatus comprising:

a base comprising a plurality of assembly holes;

a seat mounting unit assembled to an upper portion of the base through the assembly holes;

a seat mounted to an upper portion of the seat mounting unit;

a support structure assembled at a rear of the seat mounting unit;

a measurement unit assembled to the upper portion of the base through the assembly holes, the measurement unit comprising a pressure measuring device movably mounted to a number of measuring points corresponding to main body parts of a passenger in a rear seat by the support structure, wherein the measurement unit is configured to measure a physical contact with the seat and a pressing force through the pressure measuring device; and a controller configured to electrically connect the seat mounted on the seat mounting unit to apply a hot key signal to the seat to automatically perform posture switching of the seat including relax or easy access and verify safety that satisfies a pinch determination reference value or less by detecting the pressing force through the measurement unit from contact with the seat in motion.

2. The apparatus of claim 1, wherein the base comprises a wheel portion assembled at a lower portion of the base for movement.

3. The apparatus of claim 1, wherein the seat mounting unit comprises:

a support panel assembled to the assembly holes through a fastening member; and a vertical support fixed on both sides of the base in a width direction of the base, wherein the seat, which has an automated function of enabling one-touch posture switching applied, is mounted on an upper portion of the vertical support.

4. The apparatus of claim 1, wherein the measurement unit comprises:

a first measurement unit configured to measure the pressing force by setting a first pressure measuring device to a first plurality of measurement points corresponding to a knee position of the passenger in the rear seat; and a second measurement unit configured to measure the pressing force by setting a second pressure measuring device to a second plurality of measurement points corresponding to an instep or a shin height position of the passenger in the rear seat.

5. The apparatus of claim 4, wherein the first pressure measuring device comprises:

a first specimen configured to physically contact a seat back of the seat and having a shape of a hemisphere;

a first housing accommodating a first rod connected to a center of the first specimen; and a first load cell positioned at a lower portion of the first rod and configured to measure the pressing force caused by the physical contact between the first specimen and the seat back.

6. The apparatus of claim 5, wherein the second pressure measuring device comprises:

a second specimen configured to physically contact a seat cushion of the seat and having the shape of the hemisphere;

a second housing accommodating a second rod connected to a center of the second specimen; and a second load cell positioned at a lower portion of the second rod and configured to measure the pressing force caused by the physical contact between the second specimen and the seat cushion.

7. The apparatus of claim 6, wherein the first specimen and the second specimen are provided in various sizes to fit an average body size of the passenger taking into account a region of sale of a vehicle, an age of the passenger, or a gender of the passenger, and are replaceable and mountable according to measurement requirements upon verification of the seat.

8. An apparatus for verifying a vehicle seat anti-pinch, the apparatus comprising:

a base comprising a plurality of assembly holes;

a seat mounting unit assembled to an upper portion of the base through the assembly holes;

a seat mounted to an upper portion of the seat mounting unit;

a support structure assembled at a rear of the seat mounting unit, the support structure comprising:

a support panel assembled to the upper portion of the base;

vertical frames installed vertically on both sides of the support panel in a width direction of the support panel, each of the vertical frames comprising a vertical direction rail disposed on the vertical frame;

a horizontal frame movably mounted upward and downward through vertical rail brackets connected respectively to the vertical direction rails, the horizontal frame comprising a horizontal direction rail disposed on one side of the horizontal frame; and a mounting bracket mounted on the horizontal direction rail to be movable left and right through a horizontal rail bracket and having a forward and rearward direction rail disposed on an upper surface of the mounting bracket;

a measurement unit assembled to the upper portion of the base through the assembly holes, the measurement unit comprising a pressure measuring device movably mounted to a number of measuring points corresponding to main body parts of a passenger in a rear seat by the support structure, wherein the measurement unit is configured to measure a physical contact with the seat and a pressing force through the pressure measuring device; and a controller configured to electrically connect the seat mounted on the seat mounting unit to apply a hot key signal to the seat to automatically perform posture switching of the seat including relax or easy access and verify safety that satisfies a pinch determination reference value or less by detecting the pressing force through the measurement unit from contact with the seat in motion.

9. The apparatus of claim 8, wherein the support panel is assembled at a certain distance apart from the seat mounting unit based on front and rear distances of the seat according to package conditions of a vehicle.

10. The apparatus of claim 8, wherein the horizontal frame is rotatably connected to the vertical rail brackets on both sides through angle adjustment plates disposed at both ends of the horizontal frame, wherein the angle adjustment plates are configured to adjust an angle of the pressure measuring device.

11. The apparatus of claim 10, wherein each of the angle adjustment plates is configured to rotate relative to the horizontal frame about an axis, adjust a desired angle, and be fixed by engaging a fastening member in a fixing hole.

12. The apparatus of claim 8, wherein each of the vertical rail brackets is slidably mounted on the vertical direction rail and fixed by a fixing unit in such a manner that a damper fixed on a thread is configured to tighten the vertical direction rail by rotation of a lever.

13. The apparatus of claim 8, wherein the pressure measuring device is mounted to be movable forward and rearward on the forward and rearward direction rail through a forward and rearward rail bracket disposed on one surface of a housing of the pressure measuring device.

14. The apparatus of claim 8, wherein the base comprises a wheel portion assembled at a lower portion of the base for movement.

15. A method of verifying a vehicle seat anti-pinch, the method comprising:

mounting a front seat on a seat mounting unit assembled on an upper portion of a base;

installing a first measurement unit and a second measurement unit corresponding to main body parts of a passenger in a rear seat behind the front seat on the upper portion of the base, respectively, by reflecting a package condition that includes a spacing between the front seat and the rear seat of a vehicle;

fixing a first pressure measuring device to a knee position of the passenger by adjusting a position of the first pressure measuring device through a support structure of the first measurement unit;

fixing a second pressure measuring device to an instep or a shin height position of the passenger by adjusting a position of the second pressure measuring device through a support structure of the second measurement unit;

applying, by a controller electrically connected to the seat, a hot key signal to the seat to automatically perform posture switching of the seat including relax or easy access and determining whether there is a contact with the front seat that is operating rearward through the first pressure measuring device and the second pressure measuring device; and determining whether a pinch occurs based on whether a reference value is exceeded by identifying a pressing force in response to a contact signal being received from the first pressure measuring device or the second pressure measuring device.

16. The method of claim 15, wherein fixing the first pressure measuring device and fixing the second pressure measuring device each comprise setting a first specimen and a second specimen to the knee position and the instep or the shin height position, respectively, by adjusting positions of the first specimen and the second specimen upward and downward, left and right, or forward and rearward, and by adjusting angles of upward and downward rotation of the first specimen and the second specimen through each of the support structures, respectively.

17. The method of claim 15, wherein determining whether the pinch occurs comprises determining that a body part of the passenger is pinched based on the pressing force exceeding a reference value as a result of an operation of automatically performing posture switching of the seat.

18. The method of claim 17, wherein following determining that the body part of the passenger is pinched, the method further comprises:

notifying that the pinching has occurred at the knee position or at the instep or the shin height position of the passenger according to a subject transmitting the contact signal; and converting a degree of pinching according to the pressing force into a database format and storing the degree of pinching into a database.

19. The method of claim 15, wherein, after determining whether the pinch occurs, the method further comprises:

identifying whether verification of all automation functions applied to the seat has been completed through the controller; and in response to a determination that the verification of all automation functions has not been completed, operating a next queued automation function and identifying whether there is a contact with the seat that is operating rearward through the first pressure measuring device and the second pressure measuring device.

20. The method of claim 19, wherein identifying whether the verification of all automation functions has been completed comprises ending the verification when all automation functions have been verified and generating a verification result report based on data stored in a database according to a result of the automation function verification of the seat.

\* \* \* \* \*